(No Model.)

T. W. SIMCOX.
LOOSE OR IDLE PULLEY.

No. 478,292. Patented July 5, 1892.

Witnesses
F. M. Johnson
L. A. Holhaupter

Inventor
Thomas W. Simcox
By his Attorneys,
C. A. Snow & Co.

UNITED STATES PATENT OFFICE.

THOMAS W. SIMCOX, OF FOSTORIA, OHIO.

LOOSE OR IDLE PULLEY.

SPECIFICATION forming part of Letters Patent No. 478,292, dated July 5, 1892.

Application filed November 2, 1891. Serial No. 410,662. (No model.)

*To all whom it may concern:*

Be it known that I, THOMAS W. SIMCOX, a citizen of the United States, residing at Fostoria, in the county of Seneca and State of Ohio, have invented a new and useful Loose or Idle Pulley, of which the following is a specification.

This invention relates to pulleys; and it has for its object to provide a loose or idle pulley that is not only provided with means whereby lateral adjustment may be had for the purpose of taking up the wear of the pulley upon the shaft, but also to provide a pulley of this character which is easily and automatically lubricated.

With these and other objects in view, which will appear as the nature of the invention is better understood, the same consists in an idler constructed in the novel manner hereinafter more fully described, illustrated, and claimed.

Figure 1:
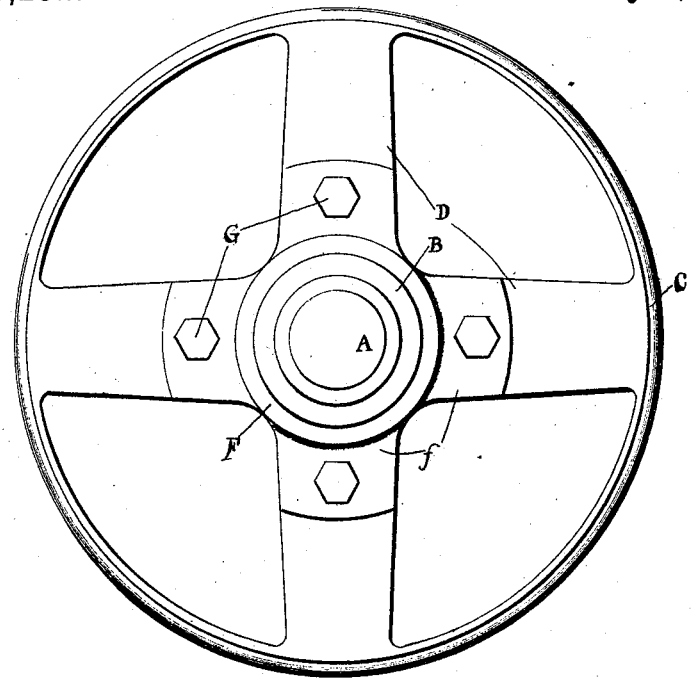
Figure 2:
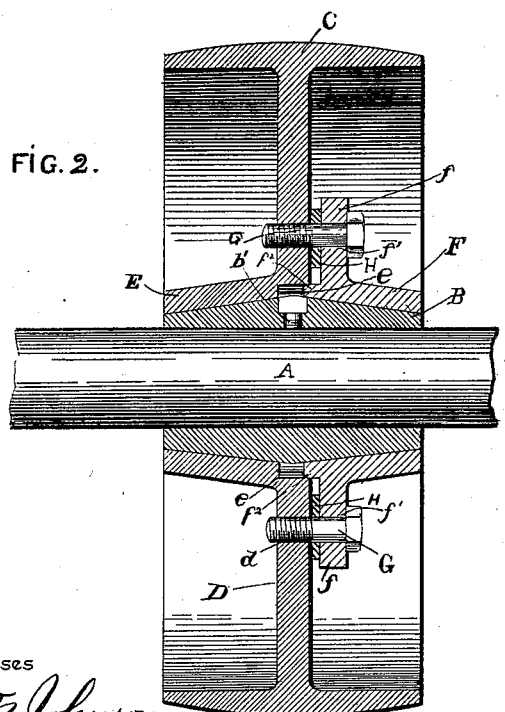
Figure 3:
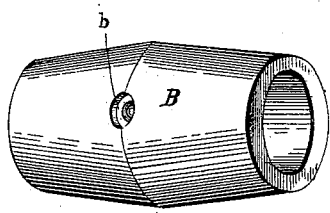

In the accompanying drawings, Figure 1 is a side elevation of a loose or idle pulley constructed in accordance with my invention. Fig. 2 is a vertical transverse section of the same mounted upon a shaft. Fig. 3 is a detail perspective of the double-cone shaft-sleeve.

Referring to the accompanying drawings, A represents an ordinary shaft operated by any machinery and designed to be provided with an idler-pulley for the ordinary purposes of belt-shifting. Rigidly secured to said shaft is a double-cone sleeve or collar B, provided with a countersunk perforation $b$, that is designed to receive a clamping-screw $b'$, passing through said perforation, and thus securing said sleeve or collar rigidly upon the shaft A. The idler-pulley C is designed to be secured upon and work over said sleeve or collar B, revolving with the shaft, and the same is cast in the ordinary manner, having the radial spokes D, but has cast integral with the spokes and the rim thereof the half hub E, that is designed to fit snugly over one of the cone-halves of said double-cone sleeve or collar and revolve thereover, said half-hub being of course cast in a conical shape to correspond with the shape of one-half of said sleeve. Each of said spokes D is provided with a threaded opening or perforation $d$, and the inner edge and lower inner ends of the half-hub and the spokes, respectively, are provided with a continuous squared annular recess or groove $e$, that is designed for the reception of oil or other lubricant to continuously lubricate the idler and the cone-sleeve over which the same revolves. The idler C is secured over and held upon said double cone by means of the detachable and adjustable half-hub section or clamp F. The said hub section or clamp F is cast in a conical shape to fit the opposite half of the double-cone sleeve and is provided with the radially-extending arms $f$, having the perforations $f'$, that are designed to receive the cap-bolts G passing therethrough and engaging the threaded perforations $d$ of each spoke, thus adjustably clamping the detachable hub-section with the body of the idler, the same being prevented from tightening upon the double cone, and thus preventing the idler from freely revolving thereover by means of a compressible packing H, interposed between the spokes D and the radially-extending arms $f$ of the detachable hub-section. Although the cap-bolts are used to adjustably connect the section of the idler-pulleys together, cap-screws or male threads on the half-hub and female in the pulley proper may be means advantageously employed for the purpose of adjustably securing the sections together. The said detachable hub-section F is further provided upon its inner face with an annular projecting flange $f^2$, that is designed when the same is clamped to the main body of the idler to project within the annular oil recess or groove in the half-hub, and thus close said recess and hold the oil or other lubricant therein.

The construction and operation of the herein-described idler-pulley are now thought to be apparent without further description.

Having thus described my invention, what I claim, and desire to secure by Letters Patent, is—

In an idler-pulley, the combination, with a revolving shaft, of a double-cone sleeve or collar secured upon said shaft, a pulley provided with a conical half-hub adapted to fit upon one-half of said sleeve or collar and with a squared annular recess or groove formed in the inner face of said half-hub, a detachable half-hub corresponding to the shape of the cone-sleeve and adapted to fit upon the opposite half thereof, the same being provided with a series of radially-extending arms corresponding to the spokes of the wheel and with an inwardly-projecting annular flange adapted to project within said annular recess or groove, packing interposed between said arms and the spokes of the wheel, and means for adjustably clamping said arms to said spokes, substantially as set forth.

In testimony that I claim the foregoing as my own I have hereto affixed my signature in the presence of two witnesses.

THOMAS W. SIMCOX.

Witnesses:
CHARLES L. GUERNSEY,
CHAS. A. STRAUCH.